United States Patent
Chiang

(10) Patent No.: US 8,648,494 B2
(45) Date of Patent: Feb. 11, 2014

(54) UNINTERRUPTIBLE POWER SUPPLY AND METHOD OF ENERGY SAVING THEREOF

(75) Inventor: Chih-Shang Chiang, Keelung (TW)

(73) Assignee: Powertech Industrial Co., Ltd., New Taipei (TW)

( * ) Notice: Subject to any disclaimer, the term of this patent is extended or adjusted under 35 U.S.C. 154(b) by 489 days.

(21) Appl. No.: 12/465,289

(22) Filed: May 13, 2009

(65) Prior Publication Data

US 2010/0164290 A1 Jul. 1, 2010

(30) Foreign Application Priority Data

Dec. 31, 2008 (TW) .................................. 97151568 A

(51) Int. Cl.
*H02J 9/00* (2006.01)
(52) U.S. Cl.
USPC .................................. 307/64; 307/65; 307/66
(58) Field of Classification Search
USPC ....................................................... 307/64–66
See application file for complete search history.

(56) References Cited

U.S. PATENT DOCUMENTS

| | | | | |
|---|---|---|---|---|
| 5,923,099 A | * | 7/1999 | Bilir | 307/64 |
| 5,929,538 A | * | 7/1999 | O'Sullivan et al. | 307/66 |
| 7,411,314 B2 | * | 8/2008 | Dunstan | 307/64 |
| 7,635,983 B2 | * | 12/2009 | Pecile | 324/426 |
| 2003/0048006 A1 | * | 3/2003 | Shelter et al. | 307/64 |
| 2007/0296379 A1 | * | 12/2007 | Gendron | 322/37 |

FOREIGN PATENT DOCUMENTS

| | | |
|---|---|---|
| CN | 2164069 | 5/1994 |
| CN | 2739863 | 11/2005 |
| CN | 101304180 | 11/2008 |
| TW | 220407 | 2/1994 |

* cited by examiner

*Primary Examiner* — Jared Fureman
*Assistant Examiner* — Alfonso Perez Borroto
(74) *Attorney, Agent, or Firm* — Houtteman Law LLC

(57) ABSTRACT

An uninterruptible power supply and a method of power saving thereof the uninterruptible power supply includes a switch and a backup power generator. The switch is coupled to a public power and a load, and backup power generator is coupled to the switch, the public power, and the load. Furthermore, the backup power generator is for controlling the switch and providing backup power for the load when the public power fails. Additionally, the backup power generator stops working in response to a trigger signal outputted from the load while the load is disabled.

14 Claims, 4 Drawing Sheets

UNINTERRUPTIBLE POWER SUPPLY AND METHOD OF ENERGY SAVING THEREOF

CROSS-REFERENCE TO RELATED APPLICATION

This application claims priority under 35 U.S.C. §119 to Taiwan Patent Application No. 097151568, filed on Dec. 31, 2008, in the Taiwan Intellectual Property Office, the entire contents of which are hereby incorporated by reference.

BACKGROUND OF THE INVENTION

1. Field of the Invention

The present invention relates to an uninterruptible power supply (UPS) and a method of power saving thereof; so that, compared to the prior art, the power consumption of the UPS is reduced.

2. Description of Related Art

In recent year, information technology has been developing quickly, various hardware apparatuses, such as a personal computer, a communication apparatus, and a workstation, are frequently used by every social class. Due to the fact that information may be a product of high commercial value, therefore many people utilizes all means to ensure the safety of information and normal operation of a computer system, and the demand of power quality for the computer system is becoming more and more restrictive. Because power electronic apparatuses are used more and more frequently, harmonic waves produced by power electronic apparatuses may result in that public power electronic apparatuses can not provide stable power, in addition natural disasters may also disrupt stable power supply, therefore an uninterruptible power supply has become an essential apparatus for a computer system or a communication system.

Refer to FIG. 1, an uninterruptible power supply 1 includes a battery 10, a charger 12, a converter 14, and a switch 16. While the public power AC is being provided normally, the public power AC is directly provided for a load 2 via the switch 16, the converter 14 at this point is on stand by, and the charger 12 charges the battery 10. While the public power AC fails and is not being provided normally, the converter 14 at this point is enabled, so that the battery 10 provides backup electric power AC' for the load 2 via the converter 14 and the switch 16.

However, for the prior art, the uninterruptible power supply 1 is on stand by while the load 2 is disabled, so the uninterruptible power supply 1 still need electric power therefore causing a certain amount of power consumption.

SUMMARY OF THE INVENTION

It is an object of the present invention to provide an uninterruptible power supply and method of energy saving thereof. The uninterruptible power supply can detect whether a load is disabled or not, and stops working while the load is disabled, so that power consumption can be decreased.

To achieve the above object, the present invention provides an uninterruptible power supply; the uninterruptible power supply includes a switch and a backup power generator. The switch is coupled to a public power and a load, and the backup power generator is coupled to the switch, the public power, and the load. Furthermore, the backup power generator is for controlling the switch and providing power for the load when the public power fails. Additionally, the backup power generator stops working in response to a disabled-trigger signal that is outputted from the load while the load is disabled. Moreover, the backup power generator starts working in response to an enabled-trigger signal that is outputted from the load while the load is enabled.

Additionally, the present invention further provides a method of energy saving of the uninterruptible power supply. The steps of the method comprises:

detecting whether or not the load is disabled via the uninterruptible power supply; and disabling the uninterruptible power supply if the load is disabled. However, before disabling the uninterruptible power supply, the uninterruptible power supply may first determine whether or not the public power has failed, and also determine whether or not a power storage unit has enough electric quantity.

At the same time, when the uninterruptible power supply has been disabled, the uninterruptible power supply may determine whether or not the load has been enabled again, and if the determination is yes that the load has been enabled again, then the uninterruptible power supply may be restored and be enabled. The uninterruptible power supply may also determine whether or not the public power has failed again, if the determination is yes that the power has failed again, then the uninterruptible power supply may be restored and be enabled. Additionally, the uninterruptible power supply may also determine whether or not a forced-enable-signal has occurred, if the determination is yes that the forced-enable-signal has occurred, then the uninterruptible power supply may be restored and be enabled.

In conclusion, the uninterruptible power supply of the present invention stops working when the load is disabled, and resumes operation when the load is enabled again, so that the problem of large power consumption caused by the uninterruptible power supply according to the prior art can be solved, thereby energy can be saved by the uninterruptible power supply of the present invention.

In order to further understand the techniques, means, and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
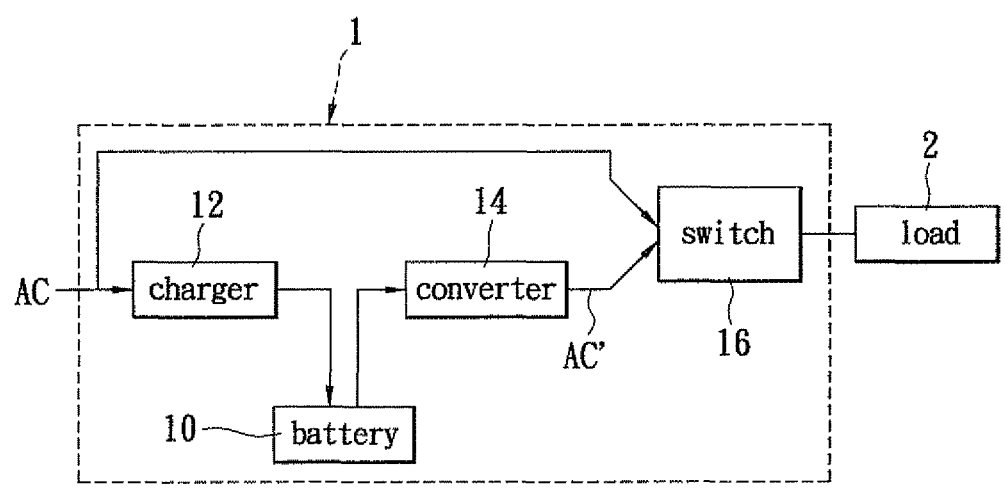
FIG. 1 is a system block diagram of an uninterruptible power supply according to the prior art.
Figure 2:
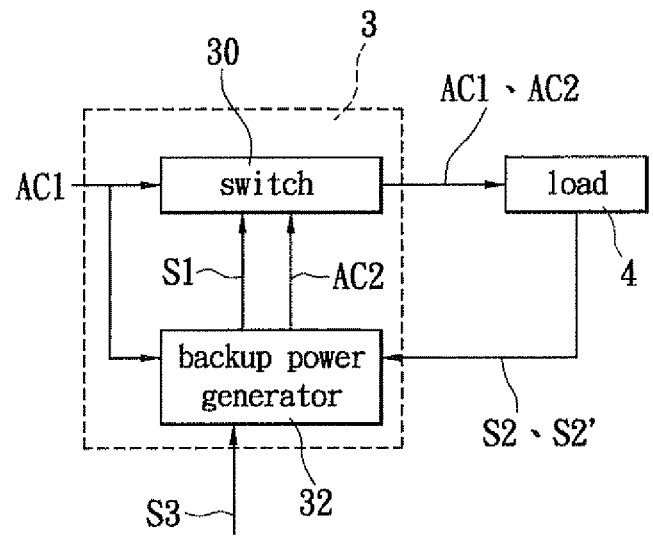
FIG. 2 is a system block diagram of an uninterruptible power supply according to the present invention.

Please refer to FIG. 2, which show a system block of an uninterruptible power supply according to the present invention. The uninterruptible power supply 3 comprises a switch 30 and a backup power generator 32, wherein the switch 30 is coupled to a public power AC1 and a load 4, and the backup power generator 32 is coupled to the switch 30, the public power AC1, and the load 4. While the uninterruptible power supply 3 is enabled, the public power AC1 can be provided for the load 4 via the switch 30, and the public power AC1 can be provided for the backup power generator 32.

On the other hand, while the public power AC1 fails (i.e. becomes interrupted), the backup power generator 32 outputs a control signal S1 to control the switch 30 so that the public power AC1 is no longer being provided to the load 4 directly. At this time, a backup power AC2 outputted from the backup power generator 32 is provided for the load 4, so that the load 4 can continue to work.

While the load 4 is disabled, the backup power generator 32 receives a disabled-trigger signal S2 outputted form the load 4, and stops working (to be noted, stops working here also indicate not being on stand by, thereby saving power) according to the disabled-trigger signal S2. Before the backup power generator 32 stops working, the backup power generator 32 would automatically detect electric quantity of a battery and the state of the public power AC1, and the backup power generator 32 is disabled after completing the detection for the battery and the public power AC1. At this time, because the backup power generator 32 is disabled, therefore power consumption can be reduced efficiently and energy can be saved.

Further, while the backup power generator 32 is disabled, the public power AC1 is provided for the load 4 via the switch 30. If the backup power generator 32 detects that the public power AC1 fails, for example, voltage surge being too high, then the backup power generator 32 is forced to be enabled, and the backup power generator 32 controls the switch 30 so that the public power AC1 is not provided for the load 4 directly, and thereby the protection of the load 4 is achieved. When the abnormal state of the public power AC1 is over, the backup power generator 32 is again disabled, and the public power AC1 is restored so as to provide electricity for the load 4 via the switch 30.

After the backup power generator 32 has been disabled, if a user wants to enable the backup power generator 32, the user can input a forced-enable-signal S3 to the backup power generator 32, so as to enable the backup power generator 32. Or the backup power generator 32 receives an enabled-trigger signal S2' outputted from the load 4 when the load 4 has been enabled, via this way the backup power generator 32 may also be enabled again.

Figure 3:
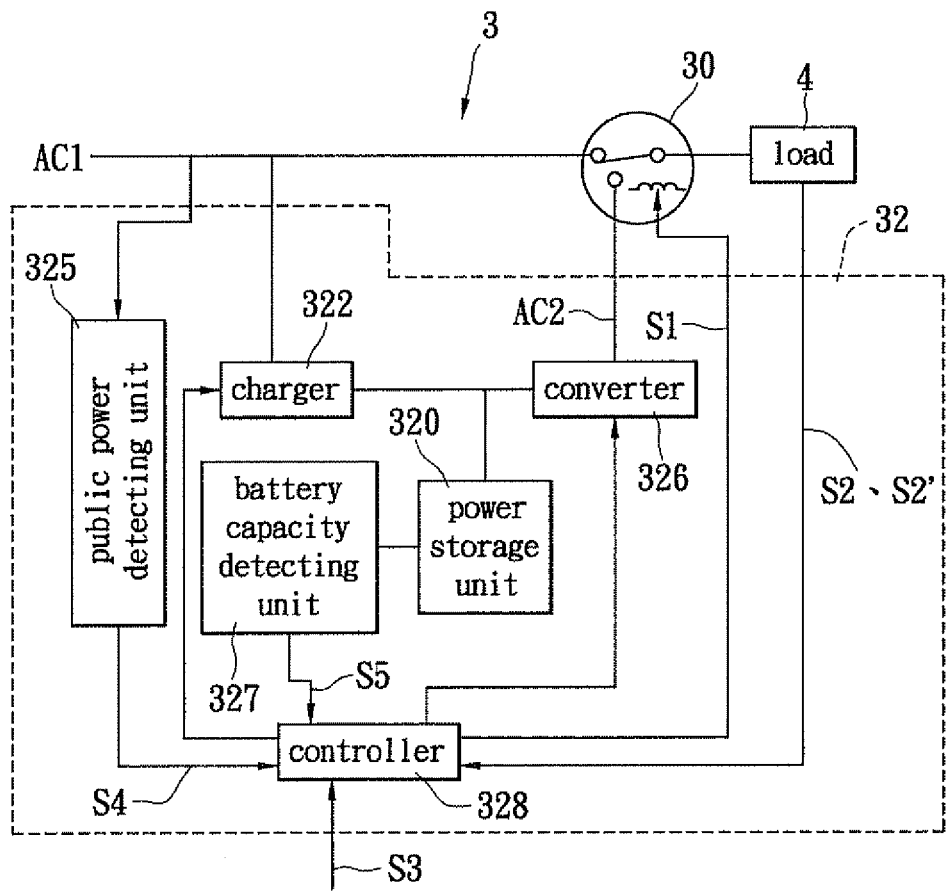
FIG. 3 is a system block diagram of a backup power generator according to the present invention.

Refer to FIG. 2 and FIG. 3, the backup power generator 32 includes a power storage unit 320, a charger 322, a converter 326, and a controller 328, wherein the charger 322 is coupled with the public power AC1 and the power storage unit 320. The converter 326 is coupled to the power storage unit 320 and the switch 30. The controller 328 is coupled to the switch 30, the charger 322, the converter 326, and the load 4. While the load 4 is disabled, the controller 328 is controlled by the disabled-trigger signal S2 that is outputted from the load 4, and then the controller 328 stops working after receiving the disabled-trigger signal S2. While the load 4 is enabled, the controller 328 is controlled by the enabled-trigger signal S2' that is outputted from the load 4, and then the controller 328 restores and starts working again after receiving the enabled-trigger signal S2'. The disabled-trigger signal S2 and the enabled-trigger signal S2' can be an electrical signal or a mechanic signal.

The backup power generator 32 further includes a public power detecting unit 325 and a battery capacity detecting unit 327, wherein the public power detecting unit 325 is coupled to the public power AC1 and the controller 328, the public power detecting unit 325 detects the public power AC1 and outputs a power signal S4 to the controller 328, and the power signal S4 includes power frequency signal, power voltage signal, and over voltage signal. Therein the public power detecting unit 325 may be a passive device, such as a resistor, thereby even when the uninterruptible power supply 3 stops working, the public power detecting unit 325 may still detect the public power AC1 and output a power signal S4 to the controller 328. Furthermore, the battery capacity detecting unit 327 is coupled to the power storage unit 320 and the controller 328, and the battery capacity detecting unit 327 detects electric quantity of the power storage unit 320 so as to output an electric quantity signal S5 to the controller 328. Therein the electric quantity signal S5 may be used to determine whether or not the electric quantity within the power storage unit 320 is sufficient or too low.

While the backup power generator 32 of the uninterruptible power supply 3 is enabled, the public power AC1 is provided for the load 4 directly via the switch 30. At this time, the controller 328 receives the electric quantity signal S5 outputted from the battery capacity detecting unit 327, and the controller 328 controls the charger 322 according to the electric quantity signal S5. While the controller 328 determines that the electric quantity stored in the power storage unit 320 is too low according to the electric quantity signal S5, then the controller 328 controls the charger 322 to charge the power storage unit 320 via the public power AC1. In contrary, if the controller 328 determines that the electric quantity stored in the power storage unit 320 is sufficient, then the controller 328 will disable the charger 322, and the charger 322 stops charging the power storage unit 320.

When the uninterruptible power supply 3 is enabled, the controller 328 receives the power signal S4 outputted from the public power detecting unit 325 and reads the power signal S4 that includes power frequency signal, power voltage signal, and over voltage signal. When the public power AC1 fails, the controller 328 may determine the abnormal state of the public power AC1 by receiving the power signal S4 and then outputs the control signal S1 so as to control the switch 30 and enable the converter 326, and the power source of the load 4 at this time, when the public power AC1 has failed, is the converter 326 instead of the public power ACT. At this time, the converter 326 outputs backup power AC2 to the load 4 via the switch 30, and thereby the load 4 can continue working.

While the load 4 is being disabled, the controller 328 receives the disabled-trigger signal S2 outputted from the load 4, and the controller 328 stops working according to the disabled-trigger signal S2. Before the controller 328 stops working, the controller 328 automatically detects electric quantity of power storage unit 320 and the state of the public power AC1. If electric quantity of power storage unit 320 is sufficient and the public power AC1 has not failed, then the controller 328 is disabled. So that power consumption can be reduced and energy saving can be achieved by having the controller 328 disabled.

After the controller 328 is disabled, the public power AC1 is restored so as to once again be provided to the load 4 directly. At this time, if the public power AC1 fails, for example, a surge voltage is too high, then the controller 328 is forced to be enabled again according to the power signal S4 which indicates abnormality of the public power AC1. After the controller 328 is enabled, the controller 328 controls the switch 30 so that the public power AC1 is not provided for the load 4 in order to protecting the load 4. Then, when the abnormal state of the public power AC1 is over, the controller 328 is disabled again according to the power signal S4 which is shows the public power AC1 being normal, and thereby the public power AC1 is once again provided for the load 4 via the switch 30.

Furthermore, if a user wants to enable the controller 328 again, the user can input the forced-enable-signal S3 so as to enable the controller 328. Or the controller 328 can be enabled by receiving the enabled-trigger signal S2' outputted from the load 4 while the load 4 is enabled.

In summary, the uninterruptible power supply 3 stops working while the load 4 is disabled, and the uninterruptible power supply 3 is restored and starts working while the load 4 is enabled. The uninterruptible power supply 3 of the present invention can solve the problem of large power consumption caused by the uninterruptible power supply of prior art, and the aim of saving energy can be achieved.

Figure 4:
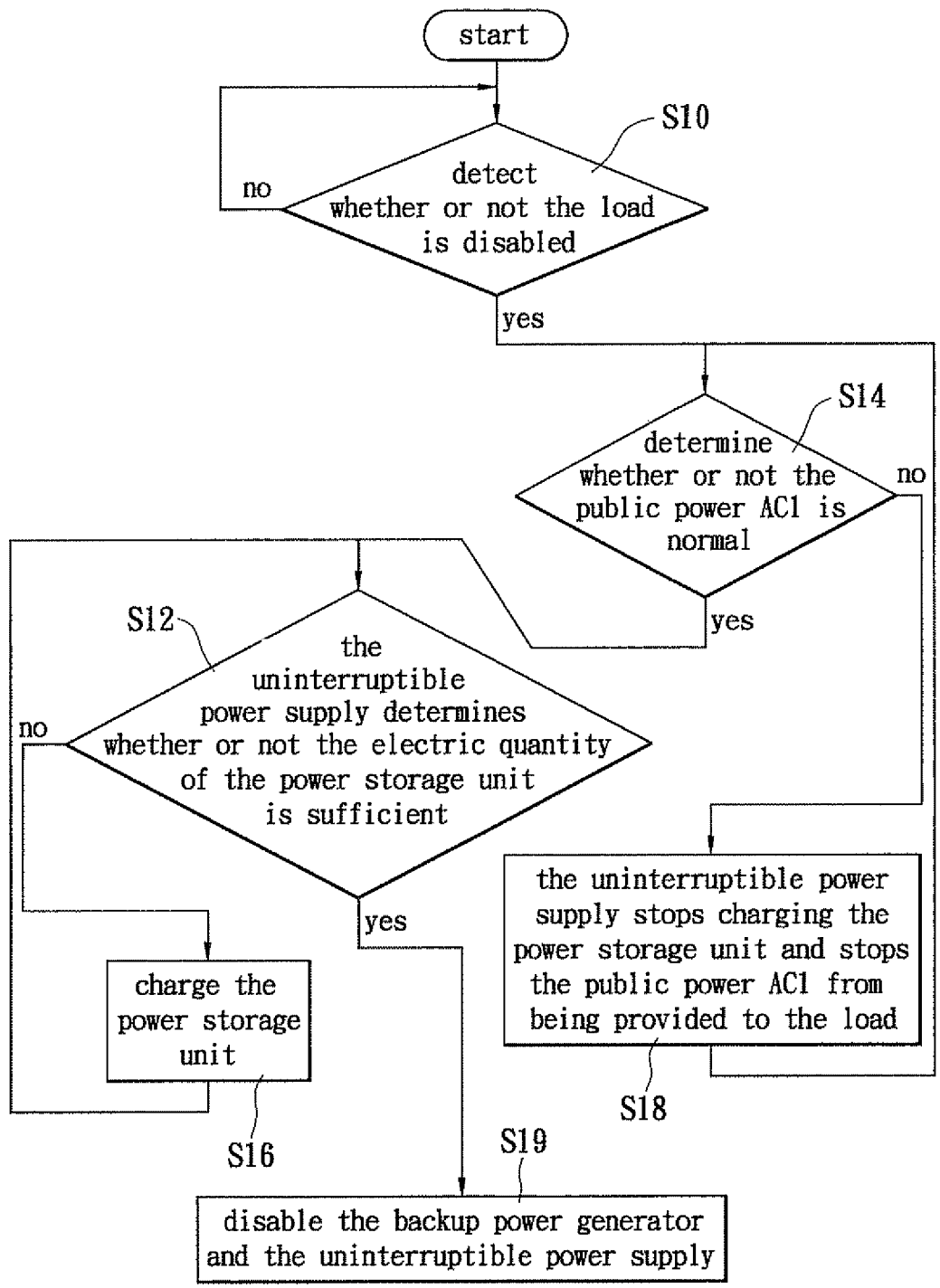
FIG. 4 is a disabling flowchart diagram of the uninterruptible power supply according to the present invention.

Refer to FIGS. 3 and 4; a method of power saving of the uninterruptible power supply 3 is presented. Firstly, detect whether or not the load 4 is disabled via the uninterruptible power supply 3 (S10). If the determination is "yes", and then determine whether or not the public power AC1 is normal (S14). After the step of S14, if the determination is no, such that the public power AC1 is abnormal, the uninterruptible power supply 3 stops charging the power storage unit 320 and stops the public power AC1 from being provided to the load 4(S18). On the other hand, after the step of S14, if the determination is yes, such that the public power AC1 is normal, then the uninterruptible power supply 3 further determines whether or not the electric quantity of the power storage unit 320 is sufficient (S12).

In the step of S12, if the determination is "no", such that the electric quantity of the power storage unit 320 is too low, then charge the power storage unit 320 (S16); if the determination is "yes", such that the electric quantity of the power storage unit 320 is sufficient, then disable the backup power generator 32 and the uninterruptible power supply 3 (S19), thereby at this point the public power AC1 provides power to the load 4.

Figure 5:
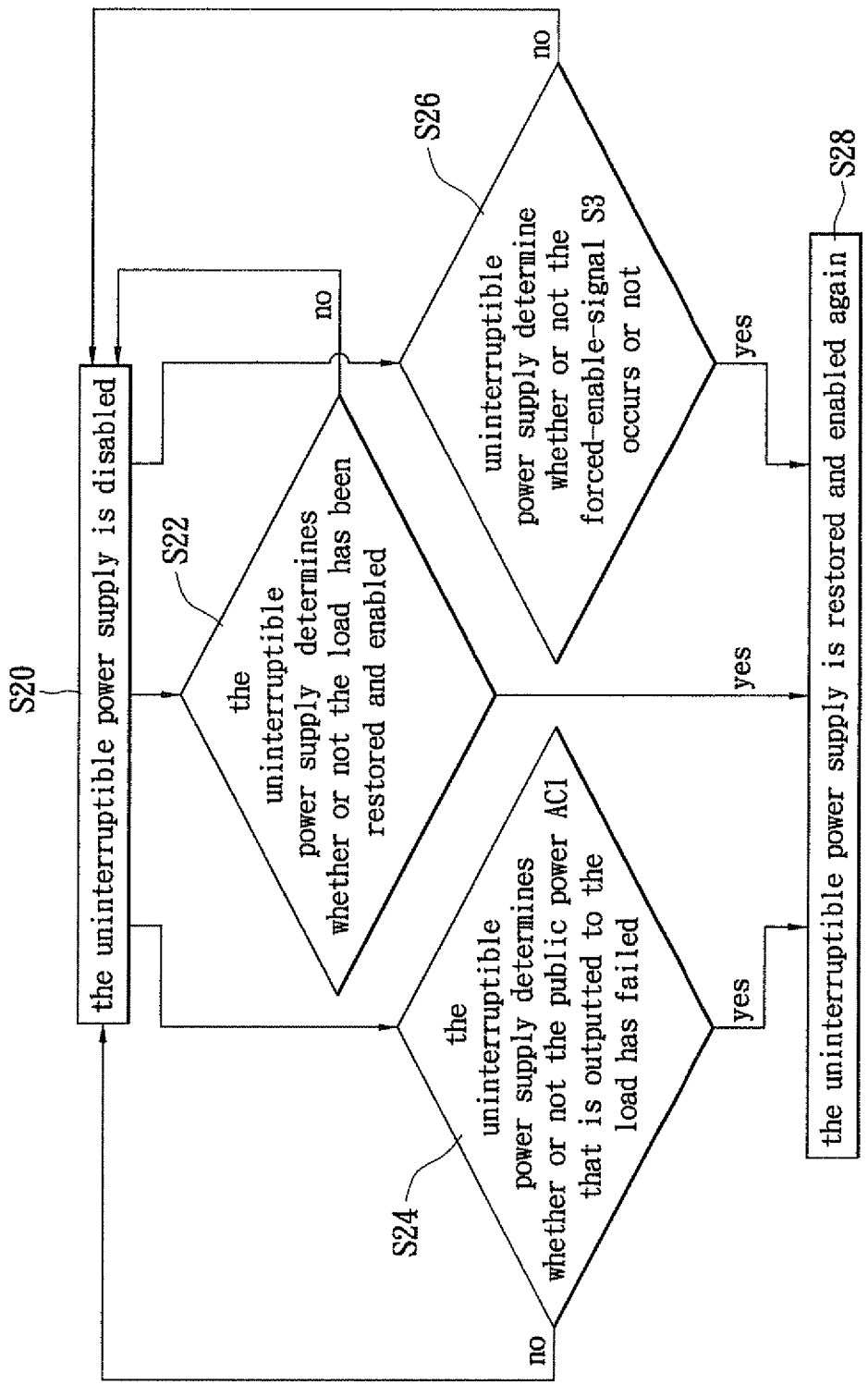
FIG. 5 is an enabling flowchart diagram of the uninterruptible power supply according to the present invention.

Refer to FIGS. 3 and 5, firstly, when the uninterruptible power supply 3 is disabled (S20), then the uninterruptible power supply 3 determines whether or not the load 4 has been restored and enabled (S22), furthermore the uninterruptible power supply 3 determines whether or not the public power AC1 that is outputted to the load 4 has failed (S24), and still furthermore the uninterruptible power supply 3 determines whether or not the forced-enable-signal S3 occurs or not (S26). And then in the steps of S22, S24, and S26, if the determination are all "no", then the uninterruptible power supply 3 remain disabled (S20). If one or more determination from the steps of S22, S24, and S26 is "yes", then the uninterruptible power supply 3 is restored and enabled again (S28).

In summary, the method of energy saving of the uninterruptible power supply makes the uninterruptible power supply 3 stops working while the load 4 is disabled, and restores the operation of the uninterruptible power supply 3 while the load 4 is enabled. Via the method of saving energy of the uninterruptible power supply, the problem of large power consumption caused by the uninterruptible power supply of prior art can be solved, and the aim of saving energy can be achieved.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. An uninterruptible power supply, coupled with a public power and a load, the uninterruptible power supply comprising:

a switch coupled to the public power and the load; and
a backup power generator coupled with the switch, the public power, and the load, wherein the backup power generator is for controlling the switch and providing power to the load when the public power fails, the backup power generator is disabled according to a determination result of whether the load is disabled and a power storage unit of the backup power generator is sufficient in an electricity and the public power is normal;
wherein when the load is disabled, the public power is normal, and the electricity is sufficient, the backup power generator and the uninterruptible power supply are disabled so as to reduce energy consumption.

2. The uninterruptible power supply as claimed in claim 1, wherein the backup power generator includes:
the power storage unit;
a charger coupled with the public power and the power storage unit;
a converter coupled with the power storage unit and the switch; and
a controller coupled with the switch, the charger, the converter, and the load, and the controller stops working in response to a disabled-trigger signal outputted from the load while the load is disabled.

3. The uninterruptible power supply as claimed in claim 2, wherein the disabled-trigger signal is an electrical signal or a mechanical signal.

4. The uninterruptible power supply as claimed in claim 2, wherein the backup power generator further includes:
a public power detecting unit and a battery capacity detecting unit, the public power detecting unit is coupled to the public power and the controller, the public power detecting unit is for detecting the public power and outputs a power signal to the controller, the battery capacity detecting unit is coupled to the power storage unit and the controller, the battery capacity detecting unit is for detecting the electricity of the power storage unit and outputs an electric quantity signal to the controller.

5. An uninterruptible power supply, coupled with a public power and a load, the uninterruptible power supply comprising:
a switch coupled to the public power and the load; and
a backup power generator coupled with the switch, the public power, and the load, wherein the backup power generator is for controlling the switch and providing backup power for the load when the public power fails, and the backup power generator is disabled when the load is disabled, the public power is normal, and a power storage unit of the backup power generator has sufficient electric quantity;
wherein the backup power generator starts working when the load is enabled.

6. The uninterruptible power supply as claimed in claim 5, wherein the backup power generator includes:
the power storage unit;
a charger coupled with the public power and the power storage unit;
a converter coupled with the power storage unit and the switch; and
a controller coupled with the switch, the charger, the converter, and the load, the controller is enabled in response to an enabled-trigger signal outputted from the load while the load is enabled.

7. The uninterruptible power supply as claimed in claim 6, wherein the enabled-trigger signal is an electrical signal or a mechanical signal.

8. The uninterruptible power supply as claimed in claim 6, wherein the backup power generator further includes:

a public power detecting unit and a battery capacity detecting unit, the public power detecting unit is coupled to the public power and the controller, the public power detecting unit is for detecting the public power and outputs a power signal to the controller, the battery capacity detecting unit is coupled to the power storage unit and the controller, the battery capacity detecting unit is for detecting the electricity of the power storage unit and outputs an electric quantity signal to the controller.

9. A method of power saving of an uninterruptible power supply, comprising:

detecting whether or not a load is disabled via an uninterruptible power supply;

if the determination is such that the load is disabled, determining whether or not a public power has failed;

if the determination is such that the public power is normal, determining whether or not a power storage unit of a backup power generator of the uninterruptible power supply is sufficient in electricity; and if the determination is such that the power storage unit is sufficient in electricity, then the backup power generator and the uninterruptible power supply are disabled so as to reduce energy consumption.

10. The method of power saving of the uninterruptible power supply as claimed in claim 9, wherein if the determination is such that the public power has failed, then the uninterruptible power supply stops charging the power storage unit and stops providing the public power to the load.

11. The method of power saving of the uninterruptible power supply as claimed in claim 9, wherein if the determination is such that the power storage unit is too low, then the power storage unit is charged.

12. The method of power saving of the uninterruptible power supply as claimed in claim 9, wherein after the uninterruptible power supply is disabled while the load is disabled, further comprising determining whether or not the load has been enabled again according to an enabled-trigger signal sent by the load to the uninterruptible power supply, and if the load has been enabled again then the uninterruptible power supply is also enabled again.

13. The method of power saving of the uninterruptible power supply as claimed in claim 9, wherein after the uninterruptible power supply is disabled while the load is disabled, further comprising determining whether or not a public power that is provided for the load is abnormal according to a power signal, and if the public power that is provided for the load is abnormal the uninterruptible power supply is enabled.

14. The method of power saving of the uninterruptible power supply as claimed in claim 9, wherein after the uninterruptible power supply is disabled while the load is disabled, further comprising determining whether or not a forced-enable-signal has occurred, and if the forced-enable-signal has occurred the uninterruptible power supply is enabled.

* * * * *